US010010976B2

(12) United States Patent
Chanteloup et al.

(10) Patent No.: US 10,010,976 B2
(45) Date of Patent: Jul. 3, 2018

(54) LASER WELDING HEAD AND PROCESS

(71) Applicant: TURBOMECA, Bordes (FR)

(72) Inventors: Denis Luc Alain Chanteloup, Gelos (FR); Jean Marc Dubourdieu, Mazerolles (FR); Olivier Lamaison, Montardon (FR); Christian Vally, Pau (FR)

(73) Assignee: TURBOMECA, Bordes (FR)

( * ) Notice: Subject to any disclaimer, the term of this patent is extended or adjusted under 35 U.S.C. 154(b) by 74 days.

(21) Appl. No.: 14/653,448

(22) PCT Filed: Dec. 16, 2013

(86) PCT No.: PCT/FR2013/053090
§ 371 (c)(1),
(2) Date: Jun. 18, 2015

(87) PCT Pub. No.: WO2014/096653
PCT Pub. Date: Jun. 26, 2014

(65) Prior Publication Data
US 2016/0184928 A1 Jun. 30, 2016

(30) Foreign Application Priority Data

Dec. 19, 2012 (FR) ..................... 12 62368

(51) Int. Cl.
*B23K 26/00* (2014.01)
*B23K 26/14* (2014.01)
*B23K 26/142* (2014.01)

(52) U.S. Cl.
CPC ........ *B23K 26/1462* (2015.10); *B23K 26/142* (2015.10); *B23K 26/1464* (2013.01); *B23K 26/147* (2013.01)

(58) Field of Classification Search
CPC ... B23K 26/14–26/142; B23K 26/1462; B23K 26/1464–26/1494
(Continued)

(56) References Cited

U.S. PATENT DOCUMENTS 5,239,552 A * 8/1993 Okuyama .......... B23K 26/1476
219/121.6
5,504,301 A * 4/1996 Eveland ................ B23K 26/18
219/121.67
(Continued)

FOREIGN PATENT DOCUMENTS

AT         391436      * 10/1990
AT         409602 B      9/2002
(Continued)

OTHER PUBLICATIONS

Office Action dated Apr. 20, 2016 in Chinese Patent Application No. 2013800664082 (submitting English translation only).
(Continued)

*Primary Examiner* — Sang Y Paik
(74) *Attorney, Agent, or Firm* — Oblon, McClelland, Maier & Neustadt, L.L.P.

(57) ABSTRACT

A laser welding head is configured to fasten under a focusing lens for focusing the laser and including at least one annular nozzle for injecting a protective gas, and a protective chamber for protecting the focusing lens with a transverse flow of air. The annular nozzle is arranged around an unobstructed optical axis passing through the laser welding head. The chamber for protecting the focusing lens with a transverse flow of air includes air admission and air exhaust in register with the air admission in a plane substantially perpendicular to said optical axis. The laser welding head is configured to be fastened against the focusing lens without any lateral opening between the focusing lens and the protective cham-
(Continued)

ber. The head presents a distance of at least 100 mm between an outlet of the annular nozzle and the protective chamber.

11 Claims, 1 Drawing Sheet

(58) Field of Classification Search
USPC .......................................... 219/121.6–121.86
See application file for complete search history.

(56) References Cited

U.S. PATENT DOCUMENTS

| | | | | |
|---|---|---|---|---|
| 5,607,606 A * | 3/1997 | Mori | ................... | B23K 26/046 219/121.67 |
| 5,747,771 A * | 5/1998 | O'Neill | ................ | B23K 26/147 148/202 |
| 5,866,870 A * | 2/1999 | Walduck | ........... | B23K 26/1429 219/121.45 |
| 6,204,475 B1 * | 3/2001 | Nakata | ................ | B23K 26/147 219/121.84 |
| 6,563,130 B2 * | 5/2003 | Dworkowski | ....... | B23K 26/048 219/121.6 |
| 6,822,187 B1 * | 11/2004 | Hermann | ........... | B23K 26/0884 219/121.63 |

FOREIGN PATENT DOCUMENTS

| | | | |
|---|---|---|---|
| CN | 101318260 | A | 12/2008 |
| DE | 10017845 | C1 | 1/2002 |
| FR | 2829413 | A1 | 3/2003 |
| JP | H05-185266 | | 7/1993 |
| JP | 5-277780 | A | 10/1993 |
| JP | 8-39280 | A | 2/1996 |
| JP | 9-277080 | A | 10/1997 |
| JP | 11-509477 | A | 8/1999 |
| JP | 2008-311498 | A | 12/2008 |
| JP | 2010-284696 | A | 12/2010 |

OTHER PUBLICATIONS

International Search Report dated May 2, 2014 in PCT/FR2013/053090 filed Dec. 16, 2013.

Office Action dated Oct. 3, 2017 in corresponding Japanese Patent Application No. 2015-548707 (English Translation only), citing documents AO, AP, AQ, AR, AS and AT therein, 6 page.

Russian Office Action dated Dec. 6, 2017 in Russian Application No. 2015129567, 6 pages.

Office Action dated Apr. 3, 2018 in Japanese Patent Application No. 2015-548707 (English-translation only).

* cited by examiner

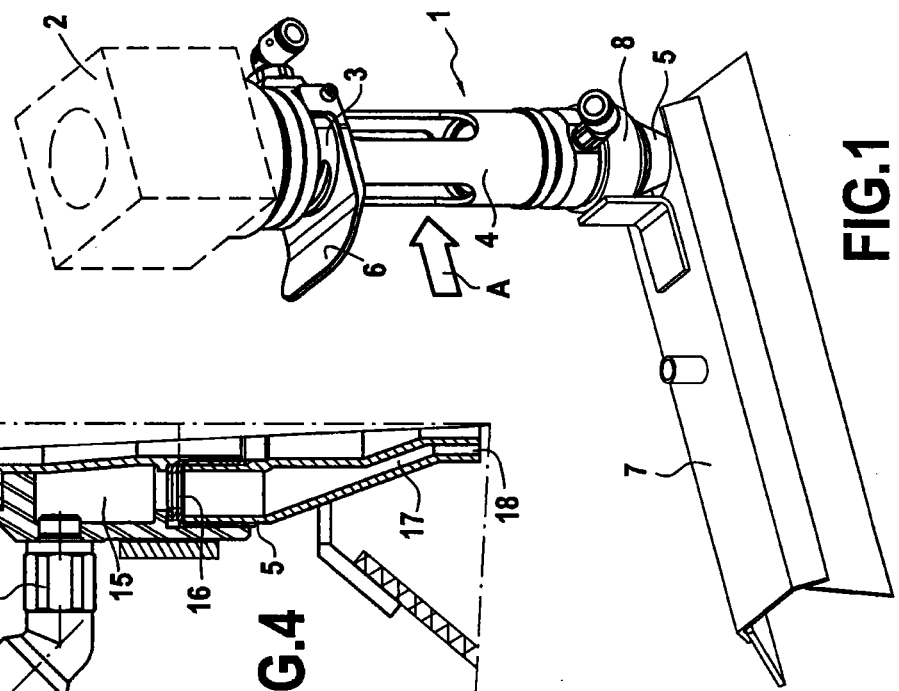
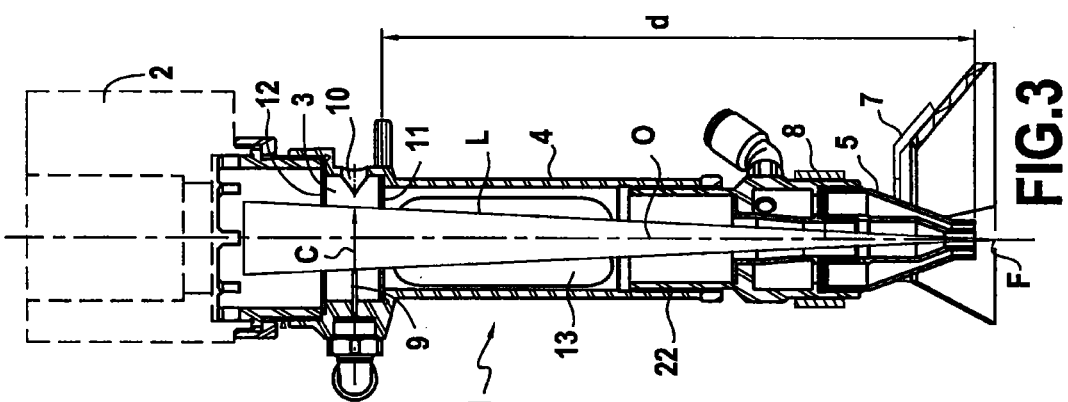
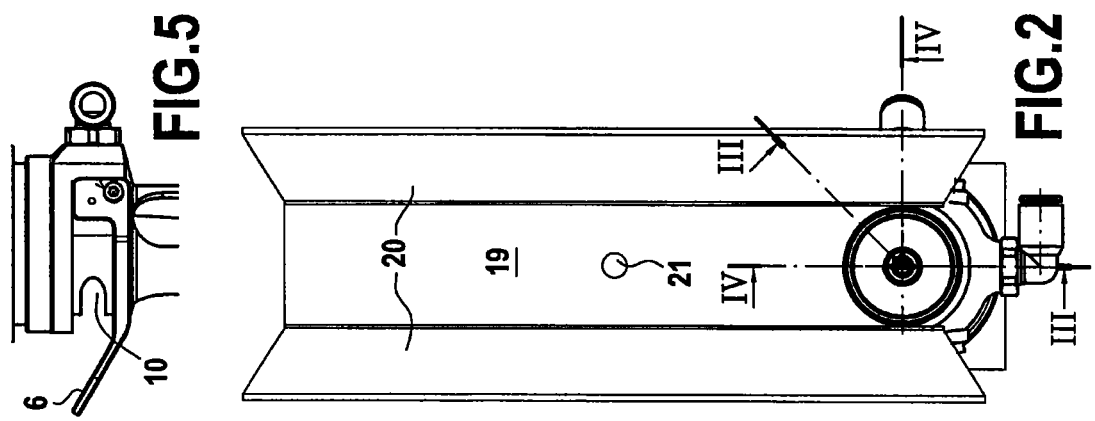
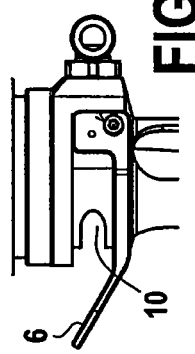

LASER WELDING HEAD AND PROCESS

BACKGROUND OF THE INVENTION

The present invention relates to the field of laser welding and in particular to a laser welding head and also to a welding method using the head.

Laser welding is a technique that enables a plurality of parts made of meltable material, and in particular of metal material, to be assembled together by delivering energy by means of a laser beam. The laser beam is focused on a focal point between two adjacent parts and serves to heat the material for welding locally to above its melting point, thereby enabling the two parts to be welded together in a join plane. Progressively advancing the welding point perpendicularly to the focusing axis of the laser beam then enables the adjacent parts to be joined together along a line of welding following this direction of advance.

In order to avoid oxidation of the material in the line of welding, the person skilled in the art knows that an inert protective gas, such as argon for example, can be injected onto the focal point through an annular nozzle situated around the focusing axis.

Nevertheless, a drawback of that technique lies in progressive deterioration of the optical element used for directing and focusing the laser, and in particular of the focusing lens located at the end of the light path. Since this lens is exposed to an environment that is aggressive, with hot gas, dust, and droplets of molten metal, it can become degraded quickly. Unfortunately, the cost of such optical elements is very high, and replacing them frequently can significantly penalize the use of a laser welding device.

Placing a protective pane in front of the focusing lens enables this drawback to be solved in very imperfect manner only. Even if such a pane is less expensive than a focusing lens, frequently replacing it as a result of its own degradation also constitutes a significant cost, not only because of the cost of replacing it, but also because of the need to stop the laser welding device in order to replace the pane.

Proposals have thus been made to protect the focusing lens by a transverse flow of air flowing past the front of the lens in order to keep hot gas, dust, and droplets away that might otherwise degrade the surface of the focusing lens. Nevertheless, the effectiveness of such a "crossjet" technique can be limited. In particular, if it is combined with injecting a protective gas around the focusing axis, aerodynamic interactions between the transverse flow of air and the jet of protective gas can destabilize the jet of protective gas, thereby exposing the molten material to undesired oxidation.

OBJECT AND SUMMARY OF THE INVENTION

The present description seeks to remedy those drawbacks. In particular, it seeks to propose a laser welding head for fastening under a focusing lens for focusing the laser, the head comprising at least an annular nozzle for injecting a protective gas and arranged around an optical axis, and a protective chamber for protecting the focusing lens by means of a transverse flow of air, the chamber having air admission and air exhaust in register with the air admission in a plane that is substantially perpendicular to said optical axis, while nevertheless making it possible to avoid harmful aerodynamic interactions between the jet of protective gas and the transverse flow of air.

In at least one embodiment, this object can be achieved by the fact that the laser welding head is configured to be fastened against said focusing lens without any lateral opening between the focusing lens and said protective chamber, and in that it presents a distance of at least 100 millimeters (mm) between an outlet of the annular nozzle and said protective chamber.

By means of these provisions, the harmful aerodynamic interactions between the transverse flow of air and the jet of protective gas can be minimized in order to avoid as well as possible any arrival of hot gas, dust, or droplets in the vicinity of the focusing lens through the welding head or from the outside.

In particular, in order specifically to lighten the laser welding head so as to reduce its inertia and make it easier to actuate, the head may present at least one lateral opening between the protective chamber and the annular nozzle.

In order in particular to further separate the flow of air leaving via the exhaust from said protective chamber, the laser welding head may include an air deflector downstream from said air exhaust.

In order to channel the transverse flow of air through the protective chamber, while providing additional protection to the focusing lens, said protective chamber may be defined in an axial direction by at least one annular washer situated around said optical axis.

In order to obtain a uniform flow at the outlet from said annular nozzle, the annular nozzle may include a plenum chamber upstream from an annular outlet.

In order to avoid liquid or solid particles entering into the plenum chamber, the annular nozzle may include a bent passage between the plenum chamber and the annular outlet. The annular nozzle may also include at least one diffuser as an alternative to or in addition to the bent passage. In particular, the bent passage may be situated downstream from the diffuser so as to provide protection for the diffuser. In particular, the diffuser may include at least one porous part or filter, e.g. a porous part, or a plurality of filters spaced apart by spacers. This at least one porous part or filter may be made of metal: thus by way of example the diffuser may comprise a porous part made of bronze.

By way of example, in order to protect the laser welding apparatus from thermal or electrical shocks, the laser welding head may include an element made of thermally and/or electrically insulating material interposed between the protective chamber and the annular nozzle.

In order to continue providing protection against oxidation for the still hot line of welding behind the advancing laser welding head, the laser welding head may further include a second nozzle for injecting protective gas, the second nozzle being arranged behind the annular nozzle relative to a direction of advance of the laser welding head. In particular, the second injection nozzle may be incorporated in a traveler fastened behind the laser welding head in order to cover the line of welding.

Furthermore, in order to better avoid aerodynamic interference between the transverse flow of air and the jet of protective gas, the air exhaust from said protective chamber may be oriented in a direction opposite from a direction of advance of the laser welding head. This avoids the advancing laser head catching up with turbulence generated by this flow of air downstream from the exhaust.

The distance between the outlet of the annular nozzle and the protective chamber may be adjustable, thus making it possible to better adapt the laser welding head to various different operating parameters.

The present disclosure also relates to a laser welding method using such a laser welding head, and wherein a laser beam is focused along the optical axis on a focal point situated under the annular nozzle, while a protective gas is injected around said focal point through said annular nozzle, while a transverse flow of air in said protective chamber protects the focusing lens, and while the laser welding head is advancing along a direction of advance perpendicular to the optical axis.

BRIEF DESCRIPTION OF THE DRAWING

The invention can be well understood and its advantages appear better on reading the following detailed description of an embodiment given by way of non-limiting example. The description refers to the accompanying drawing, in which:

FIG. 1 is a perspective view of a laser welding head in an embodiment installed on a laser welding machine;

FIG. 2 is a view of the bottom of the FIG. 1 laser welding head;

FIG. 3 is a longitudinal section of the laser welding head of FIGS. 1 and 2, on line III-III of FIG. 2;

FIG. 4 is a fragmentary section of the laser welding head of FIGS. 1 and 2, on line IV-IV of FIG. 2; and FIG. 5 is a detail view of an air deflector of the FIG. 1 laser welding head.

DETAILED DESCRIPTION OF THE INVENTION

An embodiment of a laser welding head 1 is shown in FIG. 1. The laser welding head 1 is directly mounted under a laser source 2 that may be supported in movable manner suitable for actuation by a laser welding apparatus that may be of the hinged arm type, of the gantry type, or of any other configuration known to the person skilled in the art for this application. The laser source 2 presents an optical path that leads, at its bottom end directly adjacent to the welding head 1, to a focusing lens (not shown). The laser welding head 1 shown is fastened directly under the focusing lens and comprises three main portions: a protective chamber 3 for protecting the focusing lens by means of a transverse flow of air; a cage 4; and an annular nozzle 5 for injecting a protective gas. Two other elements are fastened to the laser welding head 1: an air deflector 6 fastened to the protective chamber 3; and a traveler 7 fastened to the laser welding head 1 by a collar 8 mounted around the annular nozzle 5.

As can be seen in FIG. 2, the traveler 7 comprises a plate 19 with lateral skirts 20 and a second nozzle 21 that is connectable to a source of pressurized inert protective gas for injecting the gas into the space defined by the plate 19 and the skirts 20. A plate (not shown) having a plurality of perforations may be interposed in this space facing the plate 19 so as to form a plenum cavity and so as to distribute the injection of the protective gas coming via the second nozzle 21 over a greater area under the plate 19.

FIG. 3 is a longitudinal section of the laser welding head 1. This figure shows how the laser welding head 1 presents an unobstructed optical axis for passing the laser beam L as focused by the focusing lens on a focal point F.

The protective chamber 3 is mounted directly under the focusing lens, without leaving any lateral opening. This protective chamber 3 presents air admission 9 in the form of a slot suitable for being connected to a source of pressurized air, and air exhaust 10 of half-moon shape. The admission 9 and the exhaust 10 are arranged in register with each other in a plane perpendicular to the optical axis O, so as to create a laminar transverse flow or "crossjet" C of air in front of the focusing lens in order to protect it from hot gas, dust, or droplets that might damage it. In addition, two annular washers 11 and 12 define this protective chamber axially.

The cage 4 separates the protective chamber 3 from the annular nozzle 5 so as to maintain a distance d of at least 100 mm between them. The annular nozzle 5 and the cage 4 are coupled by complementary threads 22 enabling this distance d to be adjusted. The cage 4 has oblong lateral openings 13 in order to lighten it. By way of example, it may be made of a synthetic material based on polymers or on reinforced polymers, and it may be electrically and/or thermally insulating in order to isolate the annular nozzle 5 from the remainder of the laser welding head 1 and apparatus. Electrically insulating the annular nozzle can serve in particular to enable an anti-collision system to be used based on detecting static charge. By way of example, the cage 4 may be produced by an additive fabrication system, such as stereolithography.

The annular nozzle 5 is arranged around the optical axis O so as to pass the laser beam L, and it is connected to a source of pressurized inert protective gas, e.g. argon, for injection around the focal point F, thereby serving during welding to isolate the molten material from chemically reactive substances, and in particular from oxygen in the air. The annular nozzle 5, which is shown in greater detail in FIG. 4, has pressurized protective gas admission 14 followed in succession going downstream in the flow direction of this gas by: a plenum chamber 15; a diffuser 16; a bent passage 17; and the nozzle outlet 18. In the embodiment shown, the diffuser 16 is made up of a plurality of successive metal filters that are spaced apart by spacers. The diffuser 16 and the bent passage 17 prevent solid particles or liquid droplets ejected during laser welding from penetrating into the plenum chamber.

FIG. 5 shows the deflector 6 in detail. The deflector 6 is fastened to the outside of the protective chamber 3, immediately downstream from its exhaust 10 in the flow direction of the transverse flow of air in order to direct this air flow away from the annular nozzle 15 after escaping via the exhaust 10, thereby contributing to avoiding aerodynamic interference between this air flow and the jet of protective gas injected through the annular nozzle 5.

In operation, the laser beam L, which may be continuous or intermittent, heats the material for welding at the focal point F, while the assembly constituted by the laser welding head 1 and the laser source 2 advances relative to the material in a direction of advance A so as to form a line of welding.

The annular nozzle 5 simultaneously injects the inert protective gas around the focal point F, in particular for the purpose of preventing the molten material from oxidizing. The same inert protective gas is also injected via the second nozzle 21 under the traveler 7, which traveler extends relative to the optical axis O in the direction that is opposite to the direction of advance. Thus, the still hot material in the line of welding behind the focal point L continues to be protected while the laser welding head 1 is advancing.

Simultaneously, the pressurized air entering into the protective chamber 3 via the admission 9 flows transversely relative to the optical axis O towards the exhaust 10 so as to protect the focusing lens at the top of the blind cavity above the protective chamber 3. Relative to the optical axis O, the admission 9 faces in the direction of advance A so that this flow of air is expelled rearwards and upwards by the deflector 6 on leaving via the exhaust 10, thereby further minimizing any aerodynamic interference with the gas jet leaving the annular nozzle 5.

Although the present invention is described above with reference to a specific embodiment, it is clear that various modifications and changes can be made thereto without going beyond the general ambit of the invention as defined by the claims. Consequently, the description and the drawings should be considered in a sense that is illustrative rather than restrictive.

The invention claimed is:

1. A laser welding head comprising at least:
   a first nozzle to inject a protective gas, the first nozzle being annular and arranged around an unobstructed optical axis passing through the laser welding head;
   a protective chamber with a transverse flow of air, the chamber having an air admission and an air exhaust in a register with the air admission in a plane that is substantially perpendicular to said optical axis;
   an air deflector downstream from said air exhaust, the air deflector being outwardly inclined away from the first nozzle; and
   a second nozzle to inject protective gas, the second nozzle being arranged behind the first nozzle relative to a direction of advance of the laser welding head.

2. The laser welding head according to claim 1, defining at least one lateral opening between the protective chamber and the first nozzle.

3. The laser welding head according to claim 1, wherein said air exhaust is oriented in a direction opposite from the direction of advance of the laser welding head.

4. The laser welding head according to claim 1, wherein said protective chamber is defined in an axial direction by at least one annular washer situated around said optical axis.

5. The laser welding head according to claim 1, wherein said first nozzle includes a plenum chamber upstream from an annular outlet.

6. The laser welding head according to claim 5, wherein said first nozzle includes a bent passage between the plenum chamber and the annular outlet.

7. The laser welding head according to claim 1, including an element made of insulating material interposed between the protective chamber and the first nozzle.

8. The laser welding head according to claim 1, wherein a distance between an outlet from the first nozzle and the protective chamber is adjustable.

9. The laser welding head according to claim 1, wherein the second nozzle is incorporated in a traveler fastened behind the laser welding head.

10. The laser welding head according to claim 9, wherein the traveler comprises a plate with lateral skirts, and the second nozzle is configured to inject protective gas in a space between the plate and the lateral skirts.

11. A laser welding method using a laser welding head including at least: a first nozzle to inject a protective gas, the first nozzle being annular and arranged around an unobstructed optical axis passing through the laser welding head, a protective chamber with a transverse flow of air, the chamber having an air admission and an air exhaust in a register with the air admission in a plane that is substantially perpendicular to said optical axis, an air deflector downstream from said air exhaust, the air deflector being outwardly inclined away from the first nozzle, and a second nozzle to inject protective gas, the second nozzle being arranged behind the first nozzle relative to a direction of advance of the laser welding head, said method comprising:
   focusing a laser beam along the optical axis on a focal point situated under the first nozzle;
   injecting protective gas around the focal point through the first nozzle;
   flowing the transverse flow of air in said protective chamber and deflecting the transverse flow of air away from the focal point by the air deflector;
   advancing the laser welding head along a direction of advance perpendicular to the optical axis; and
   injecting protective gas, behind the first nozzle relative to the direction of advance of the laser welding head, through the second nozzle.

* * * * *